(12) United States Patent
Shelton

(10) Patent No.: US 9,351,124 B1
(45) Date of Patent: May 24, 2016

(54) LOCATION DETECTION AND COMMUNICATION THROUGH LATENT DYNAMIC NETWORK INTERACTIONS

(71) Applicant: Cognizant Business Services Limited, Jersey (GB)

(72) Inventor: Edward Martin Shelton, Berkeley, CA (US)

(73) Assignee: COGNIZANT BUSINESS SERVICES LIMITED, St. Helier, Jersey (GB)

(*) Notice: Subject to any disclaimer, the term of this patent is extended or adjusted under 35 U.S.C. 154(b) by 0 days.

(21) Appl. No.: 14/753,334

(22) Filed: Jun. 29, 2015

(51) Int. Cl.
*H04W 24/00* (2009.01)
*H04W 4/02* (2009.01)
*G01S 5/00* (2006.01)
*G01S 5/02* (2010.01)

(52) U.S. Cl.
CPC ............. *H04W 4/028* (2013.01); *G01S 5/0036* (2013.01); *G01S 5/0221* (2013.01)

(58) Field of Classification Search
CPC ... H04W 64/00; H04W 4/02; H04L 29/08657
USPC ........ 455/456.1, 422.1, 414.1, 404.2
See application file for complete search history.

(56) References Cited

U.S. PATENT DOCUMENTS

2009/0197616 A1* 8/2009 Lewis ............... G06Q 30/02
455/456.1
2014/0187258 A1* 7/2014 Khorashadi .......... G01C 21/206
455/456.1
2015/0004998 A1* 1/2015 Pennanen ............... H04W 4/02
455/456.1

OTHER PUBLICATIONS

"Bitcoin," Wikipedia encyclopedia entry, available at https://en.wikipedia.org/wiki/Bitcoin, accessed Oct. 13, 2015, 37 pages.
Liu, B. et al., "Dynamic Coverage of Mobile Sensor Networks," Jan. 1, 2011, pp. 1-19, available at http://arxiv.org/pdf/1101.0376.pdf, 19 pages.
Xi, W., et al., "EUL: An Efficient and Universal Localization Method for Wireless Sensor Network," 2009 29th IEEE International Conference on Distributed Computing Systems, pp. 433-440 (IEEE Computer Society 2009), 8 pages.

* cited by examiner

*Primary Examiner* — Nghi H Ly
(74) *Attorney, Agent, or Firm* — Rothwell, Figg, Ernst & Manbeck, p.c.

(57) ABSTRACT

A method is performed by a first connected sensor having accurate location data and includes detecting an identifying signal of a second sensor in proximity to the first sensor. The method includes electronically transmitting to the second sensor a set of one or more electronic transactions locally stored at the first sensor and electronically receiving from the identified second sensor a set of one or more electronic transactions locally stored at the second sensor, wherein at least one of the first and second sets of electronic transactions comprises transaction data with one or more objects of interests. The method includes merging the two sets of electronic transactions into an updated set of electronic transactions and transmitting the updated set of electronic transactions to a current state database, wherein the updated transactions may be accessed by a location server to determine the location of the one or more objects of interest.

22 Claims, 5 Drawing Sheets

LOCATION DETECTION AND COMMUNICATION THROUGH LATENT DYNAMIC NETWORK INTERACTIONS

TECHNICAL FIELD

Aspects of this disclosure relate to location determination of an object of interest in a sensor network.

BACKGROUND

The development of dynamic networks has led to a wide range of location detection possibilities for objects of interest (people, goods, etc.). Location information for an object may be determined using several techniques. For example, the location of an object may be determined and transmitted from the object itself using, for example, Global Positioning System technology ("GPS"), triangulation, cellular networks, etc. Additionally, location information for an object may be determined using sensors with known positions. For example, if an object comes within a range of a sensor with a known position, the location of the object may be determined to be within the range of the known location of the sensor.

One or more objects of interest may move freely within an area in which a wireless sensor network ("WSN") has been deployed. Each object of interest may be associated with a signature, which may comprise a transmitting or non-transmitting (e.g., active or passive) identification component. Non-transmitting identification components may include, for example, a visual signature (e.g., identified with camera face recognition) a heat signature, a RFID tag, etc. Transmitting identification components may include a technological signal. The technological signal may comprise a signal emitted from a wireless communication device, for example, a WiFi, Bluetooth, or cellular network request.

The WSN may further include one or more sensors. The sensors in the WSN may be characterized as anchored or mobile, and/or connected to or unconnected to a network (e.g., a communications network). A sensor may be capable of collecting, storing, and transmitting electronic data. Additionally, a sensor may be capable of updating accurate location data for itself if a known location detection method is available. For example, some sensors may comprise a device with satellite navigation, such as GPS.

An anchored sensor may be defined as a sensor that remains in a fixed position within the network and has accurate, static location data for itself. In contrast, a mobile sensor may change position, and may or may not have accurate location data for itself. Thus, sensors may be fixed or moving freely within a WSN.

A connected sensor may be defined as a sensor that can reliably transmit data to and receive data from a data storage and/or computation device in the WSN. In some instances, a connected sensor may have a wireless connection to other nodes or devices in the network, and in others, a connected sensor may have a wired (e.g., Ethernet) connection to other nodes or devices in the network. An unconnected sensor may be defined as a sensor that cannot reliably transmit data to and receive data from another device in the network.

Past precedents for location detection in sensor networks may fall into a few common categories. For example, one location detection procedure may assume the basis of static location triangulation, such as from cell towers or satellites. Other location detection procedures may assume the motion of sensors and the constant re-triangulation from neighboring nodes. In 2009, Wei Xi and other researchers published an improved approach in which the speed of motion of a sensor is also taken into consideration in the location calculation: EUL: an Efficient and Universal Localization Method for Wireless Sensor Network (2009, Wei Xi et al). Such continuous calculation however is done (as in this example) by each node, and thus such location determining solutions require significant computational costs on a device attached to each object being tracked.

SUMMARY

The location detection procedures described above create a high computational cost of location determination due to the use of active location determination. For example, consider a situation where an organization wishes to use location determination data for its employees in order to reconfigure the conference rooms of an office space to better address the needs of the office. The organization may place an unconnected anchor sensor with a known, fixed location that transmits a unique identifying signal, such as an iBeacon® by Apple Inc., in each conference room and require each employee to run a location-based application on their cellular and/or computing devices connected to a communications network (e.g., carry around a mobile, connected sensor). Thus, when the employee carries the connected sensor device into a conference room, the device may receive the signal from the iBeacon® device that conveys location information and in turn transmit that location information to the network. However, this technique may be less desirable because, for example, the application may run down the battery of the mobile/computing device and location data for visitors and employees whom are not carrying around a connected sensor (e.g., a cellular device with the requisite location application) may not be captured.

Accordingly, there exists a need for large scale location detection of objects of interest with transmitting and non-transmitting identification components. While some work has been done in location determination to consider network elements that are not themselves active devices, such as intrusion detection, a procedure for large scale active and passive object location determination has not previously been available.

In one aspect, a computer implemented method for use in a distributed sensor network for location determination is provided. The method is performed by a first connected sensor having accurate location data. The method includes the step of detecting an identifying signal of a second sensor in proximity to the first sensor, wherein the second sensor is a mobile sensor. The method further includes the step of electronically transmitting to the second sensor a first set of one or more electronic transactions locally stored at the first sensor. The method further includes the step of electronically receiving from the identified second sensor a second set of one or more electronic transactions locally stored at the second sensor, wherein at least one of the first and second sets of electronic transactions comprises transaction data with one or more objects of interest. The method further includes the step of merging the first set of electronic transactions with the second set of electronic transactions into an updated set of electronic transactions. The method further includes the step of storing the updated set of electronic transactions. The method further includes the step of transmitting the updated set of electronic transactions over a network to a current state database, wherein the updated transactions in the current state database may be accessed by a location server to determine the location of the one or more objects of interest.

In another aspect, a system for location determination is provided. The system includes a current state database in electronic communication with a network. The system further includes a location server comprising a processor and data storage unit in electronic communication with the network. The system further includes a mobile sensor comprising a transceiver, a scanner, a processor, and a local data storage unit, wherein the local data storage unit comprises a first set of one or more electronic transactions. The system further includes a connected sensor comprising a transceiver, a scanner, a processor, a network interface in electronic communication with the network, and a local data storage unit, wherein the local data storage unit of the connected sensor comprises a second set of one or more electronic transactions and accurate location data. The processor of the connected sensor is configured to cause the connected sensor to perform the following steps: detect, using the scanner, an identifying signal of the mobile sensor; electronically transmit to the mobile sensor the second set of one or more electronic transactions; electronically receive from the mobile sensor the first set of one or more electronic transactions, wherein at least one of the first and second sets of electronic transactions comprises transaction data with one or more objects of interest; merge the first set of electronic transactions with the second set of electronic transactions into an updated set of electronic transactions; store the updated set of electronic transactions in the local data storage unit of the connected sensor; and, transmit the updated set of electronic transactions over the network to the current state database, wherein the updated transactions in the current state database may be accessed by the location server to determine the location of the one or more objects of interest.

In another aspect, a non-transitory computer readable medium storing program instructions executable by a processor of a first connected sensor having accurate location data is provided. The computer readable medium includes program instructions for causing the first connected sensor to detect an identifying signal of a second sensor in proximity to the first sensor, wherein the second sensor is a mobile sensor. The computer readable medium includes program instructions for causing the first connected sensor to electronically transmit to the second sensor a first set of one or more electronic transactions locally stored at the first sensor. The computer readable medium includes program instructions for causing the first connected sensor to electronically receive from the identified second sensor a second set of one or more electronic transactions locally stored at the second sensor, wherein at least one of the first and second sets of electronic transactions comprises transaction data with one or more objects of interest. The computer readable medium includes program instructions for causing the first connected sensor to merge the first set of electronic transactions with the second set of electronic transactions into an updated set of electronic transactions. The computer readable medium includes program instructions for causing the first connected sensor to store the updated set of electronic transactions. The computer readable medium includes program instructions for causing the first connected sensor to transmit the updated set of electronic transactions over a network to a current state database, wherein the updated transactions in the current state database may be accessed by a location server to determine the location of the one or more objects of interest.

BRIEF DESCRIPTION OF THE DRAWINGS

The accompanying drawings, which are incorporated herein and form part of the specification, illustrate various embodiments of the present disclosure and, together with the description, further serve to explain the principles of the disclosed systems and methods and to enable a person skilled in the pertinent art to make and use those systems and methods. In the drawings, like reference numbers indicate identical or functionally similar elements.

DETAILED DESCRIPTION

The location determination methods and systems disclosed herein provide a technological improvement in the means of information collection and communication of time/location event data of objects of interest, given the possibility that in some cases sensors may not connect directly to a network but only through interactions with intermediary sensors. The collection of such data thereby enables the use of a centralized computational capability for location determination using historical data to predictively calculate object location.

Figure 1:
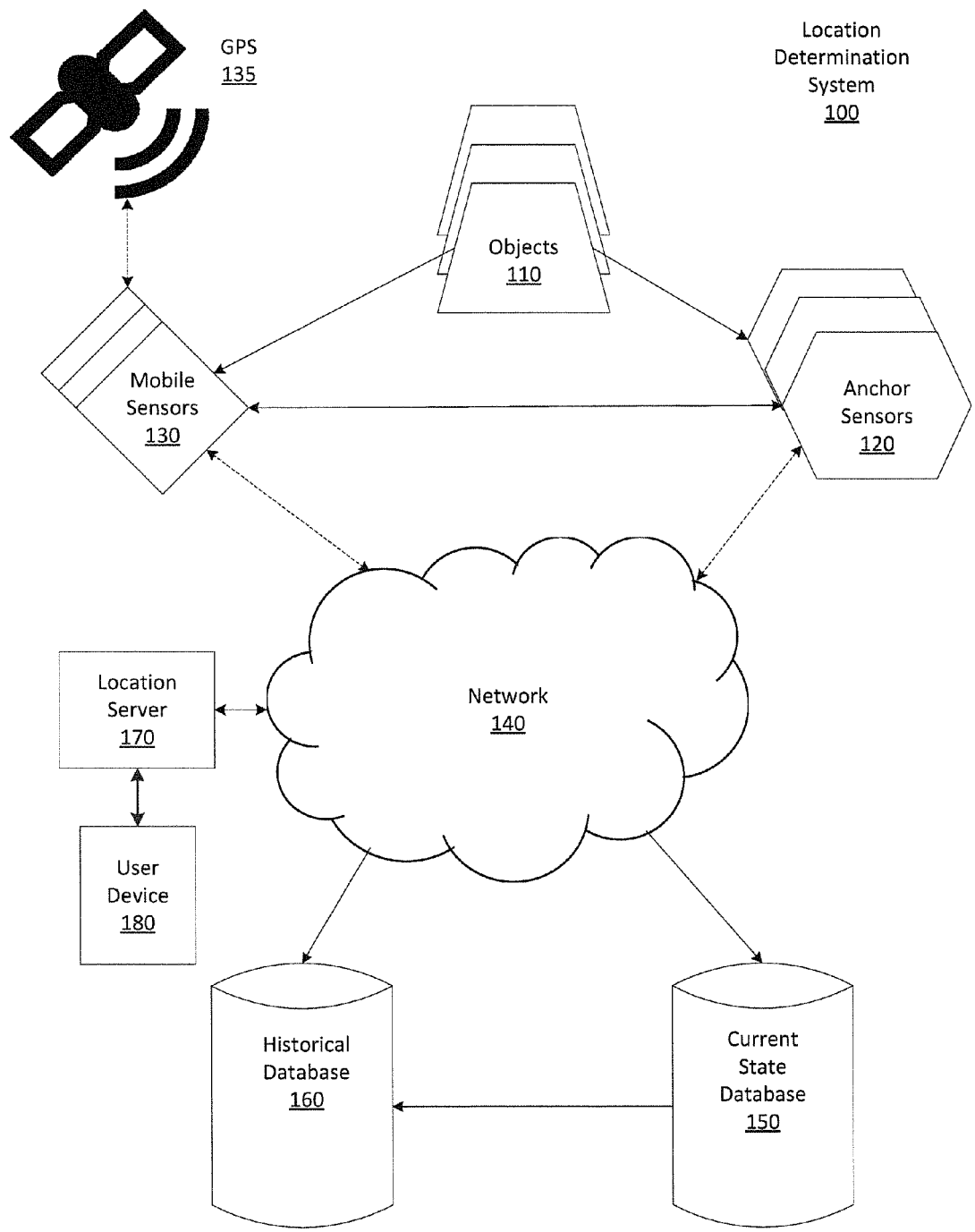
FIG. 1 is a schematic diagram of a location determination system embodying aspects of the disclosure.

FIG. 1 is a schematic diagram of a location determination system embodying aspects of the disclosure. In some embodiments, location determination system 100 may comprise a network of items including one or more objects 110, one or more anchor sensors 120, and one or more mobile sensors 130. In some embodiments, such as where accurate location data is not available for a mobile sensor 130, a mobile sensor 130 may be referred to as an object 110 for which location may be determined or predicted. As depicted by the dashed lines in FIG. 1, one or more of the anchor sensors 120 and/or mobile sensors 130 may be in electronic communication with, or connected to, network 140. In some embodiments, only a subset of anchor sensors 120 and/or mobile sensors 130 may be in electronic communication with network 140. In some embodiments, mobile sensors 130 may only have intermittent connection with network 140. In some embodiments, the network 140 may comprise a telecommunications network, such as a local computer network, the Internet, a telephone network, etc. In some embodiments, mobile sensors 130 and/or anchor sensors 120 may wirelessly transmit electronic data to network 140. In other embodiments, mobile sensors 130 and/or anchor sensors 120 may transmit electronic data to or from network 140 through a hardwire connection, such as an Ethernet cable.

The objects 110 may comprise any type of object, person, or device that has transmitting or non-transmitting unique identifying details but does not collect, store, or transmit data or may only have limited capabilities for collecting, storing, and/or transmitting data. Additionally, an object 110 is not capable of determining its location on its own. However, in some embodiments, if the object 110 is fixed, then the fixed location data may be encoded with the object 110. In some embodiments, objects 110 may transmit unique identifying components, and may comprise, for example, an RFID tag that transmits a unique identifying signal or a mobile device that transmits a unique identifier (e.g., when connecting to a network). In other embodiments, objects 110 may include non-transmitting identification components, such as a visual or heat signature (e.g., for a person). Objects 110 may move freely within location determination system 100 and may not be in electronic communication with network 140. In some embodiments, mobile sensors 130 may detect the presence or identity of nearby objects 110 (e.g., when the RFID signal of an object 110 is within the range of the mobile sensor 130 or when a visual or heat signature of an object 110 may be detected). In some embodiments, anchor sensors 120 may also detect the presence of nearby objects 110.

The anchor sensors 120 may comprise a fixed sensor with known, accurate, non-changing location data. As described in further detail below, anchor sensors 120 may be capable of collecting and storing data associated with other objects and sensors in the network, such as objects 110 and mobile sensors 130, including transaction data. In some embodiments, one or more anchor sensors 120 may be in electronic communication with network 140, and thus may be capable of transmitting transaction data via network 140. In some embodiments, anchor sensors 120 may be positioned far enough apart in location determination system 100 so that anchor sensors 120 do not directly interact with each other.

A mobile sensor 130 may comprise a mobile device or object capable of collecting, storing, and transmitting data. For example, mobile sensors 130 may be capable of updating accurate location data for itself if a known location detection method is available. For example, in some embodiments, each mobile sensor 130 may include GPS functionality and may be in electronic communication with a global positioning satellite 135 as indicated by the dashed line in FIG. 1 between mobile sensor(s) 130 and GPS satellite 135. Thus, when the GPS signal is available, the mobile sensor 130 may be capable of updating its location information according to received GPS data from satellite 135. Thus, in some embodiments, mobile sensor 130 may only have intermittent connection to GPS satellite 135. As described in further detail below, each mobile sensor may be capable of collecting and storing transaction data associated with other items in the network, such as objects 110, anchor sensors 120, and other mobile sensors 130. In some embodiments, one or more mobile sensors 130 may be in electronic communication with network 140, and thus may be capable of transmitting transaction data via network 140. In some embodiments, mobile sensors 130 may move freely within location determination system 100.

One or more anchor sensors 120 and/or mobile sensors 130 may be connected to network 140. If an anchor sensor 120 and/or mobile sensor 130 is connected to network 140, then anchor sensor 120 and/or mobile sensor 130 may be capable of transmitting transaction data to one or more nodes in network 140, such as central data storage and computation devices in electronic communication with network 140.

In some embodiments, a central data storage facility may be in electronic communication with network 140. The central data storage facility may comprise a current state database 150 and a historical database 160. In some embodiments, current state database 150 and historical database 160 may be hosted on the same node or server in electronic communication with network 140. In other embodiments, current state database 150 and historical database 160 may be hosted on separate nodes or servers, both of which are in electronic communication with network 140. In some embodiments, current state database 150 and/or historical database 160 may store data across a plurality of distributed computing devices in communication with network 140, such as in a cloud-based computing network.

The current state database 150 may be a data store (e.g., a database, distributed or cloud-based data store) that maintains current state transaction data, described in further detail below, for an appropriate operational period. An appropriate operational period may be defined as an hour, a length of a shift, a day, a week, etc., based on specific operational conditions. The historical database 160 may be a data store that maintains historical or past transaction data. For example, the historical database 160 may include past data from one or more previous operational periods. In some embodiments, the historical database 160 may also include the current state transaction data maintained in the current state database 150. In some embodiments, the current state database 150 and/or the historical database 160 also maintains information regarding the fixed, known locations of anchor sensors 120. In some embodiments, the current state database 150 and/or the historical database may further maintain accurate location data of mobile sensors 130, when such information is available.

In some embodiments, location determination system 100 further includes a location server 170. Location server 170 may be in electronic communication with network 140 and user device 180. Location server 170 may comprise a location determination or prediction application and may be capable of receiving requests from user device 180 for locating an object of interest. Thus, location server 170 may comprise, for example, a computer system containing one or more processors, a local data storage system, and one or more network interfaces and/or ports for establishing an electronic connection with network 140. User device 180 may include, for example, a computer, mobile device, tablet, etc. capable of electronically transmitting a request to location server 170 to locate an object of interest. In some embodiments, user device 180 may transmit the location determination request via network 140. In some embodiments, location server 170 may request location data for a particular object of interest included in the request from user device 180 via network 140 from the current state database 150. The location server 170 may in turn receive location data from the current state database 150 via network 140 for the particular object of interest. In some embodiments, applications running on location server 170 may analyze the transaction data stored in the current state database 150 and/or the historical database 160 to determine or predict the location of a specified object of interest.

Figure 2:
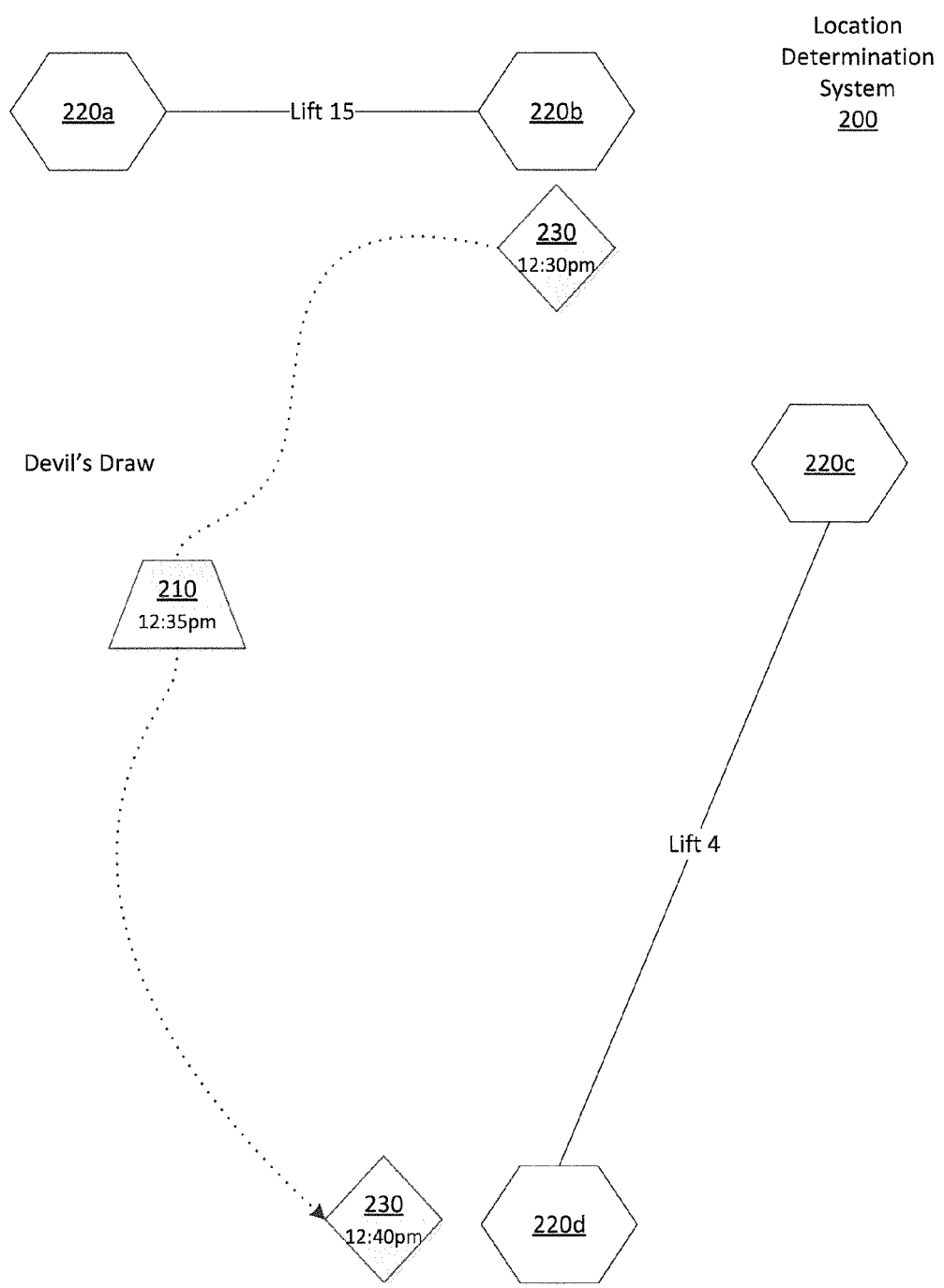
FIG. 2 is a schematic diagram of a location determination system in a simplified ski resort environment embodying aspects of the disclosure.

FIG. 2 is a schematic diagram of a location determination system in a simplified ski resort environment embodying aspects of the disclosure. For illustration purposes, a simplified ski resort with location determination system 200 is depicted in FIG. 2. The ski resort includes two lifts, labelled lift 15 and lift 4. An anchor sensor 220 (e.g., corresponding to anchor sensors 120 of FIG. 1) may be placed at each end of the lifts. For example, anchor sensors 220a and 220b are placed at the beginning and end of lift 15, respectively, and anchor sensors 220c and 220d are placed at the beginning and end of lift 4, respectively. In other embodiments, anchor sensors 220 may be placed in other prepositioned remote sensing locations (e.g., in the middle of a run). One of the areas of a ski run, called "Devil's Draw," is also depicted in FIG. 2.

There may be a plurality of mobile sensors 230 (e.g., corresponding to mobile sensors 130 in FIG. 1) and objects 210 (e.g., corresponding to objects 110 in FIG. 1) in location determination system 200 moving freely within the ski resort depicted in FIG. 2. For example, one or more patrons of the ski resort may be carrying around an object 210, such as an RFID tag (e.g., which may be used in lift access validation). Additionally, one or more employees (e.g., ski patrol), may be carrying a mobile sensor 230. In some embodiments, the mobile sensors 230 may include GPS capabilities for determining accurate location data.

As described below in connection with FIG. 5, each mobile sensor 130 may have a data storage system. In some embodiments, each mobile and anchor sensor may maintain a local sequential transaction database in the local data storage system. The local sequential transaction database records "events" or "transactions" reflecting encounters between i) two or more sensors, such as each time a mobile sensor 130 detects another proximate mobile sensor 130 or an anchor sensor 120, or each time an anchor sensor 120 detects another proximate mobile sensor 130, or ii) an object and a sensor, such as each time a mobile sensor 130 detects a proximate object 110 or each time an anchor sensor 120 detects a proximate object 110. For example, in reference to FIG. 2, each mobile sensor 230 may record a transaction in its local sequential transaction database whenever the active sensor 230 comes into proximity with an object or sensor, such as object 210, anchor sensor 220, or another mobile sensor 230. In this context, two sensors are "proximate" or "in proximity" to one another if they are physically close enough to one another to exchange data by whatever data communication means is included in each sensor. The exact distance between two proximate sensors will depend on a number of factors that will influence data communication, such as the power of respective data transmissions, receivers, and scanners; directionality (orientation) of one sensor with respect to the other; atmospheric conditions that may affect wireless data transmissions, etc. In some embodiments, "proximity" between two sensors may require a physical communication or link in order to exchange data, such as an Ethernet port and cable or other type of port. Likewise, each anchor sensor 220 may record a transaction in its local sequential transaction database whenever a mobile sensor 230 or object 210 comes into proximity with the anchor sensor 220. A transaction, described in further detail below, may comprise the unique ID of the recording sensor, the unique ID of a nearby (proximate) sensor or object, and a timestamp reflecting the time (and possibly date) of the transaction. Additionally, when a mobile sensor 230 comes into proximity of either an anchor sensor 220 or another mobile sensor 230, the mobile sensor 230 and anchor sensor 220 or mobile sensor 230 will exchange their stored updated sequential transactions. If/when the mobile sensor 230 is connected to a network 140, the mobile sensor may transmit the updated stored sequential transactions, or blockchain, for entry into current state database 150 (not pictured in FIG. 2). Additionally, if an anchor sensor 220 is connected to network 140, the anchor sensor 220 may transmit the updated transaction blockchain to network 140 for entry into current state database 150.

Blockchain technology is used in the online payment system called Bitcoin, which uses a decentralized virtual currency. For example, as explained on Wikipedia, a blockchain is a public ledger that records bitcoin transactions without any trusted central authority. See "Bitcoin," available at http://en.wikipedia.org/wiki/Bitcoin, accessed May 1, 2015. Maintenance of the blockchain is performed by a network of communicating nodes running bitcoin software. Id. For example, network nodes may validate transactions, add them to their copy of the ledger, and broadcast these ledger additions to other nodes.

According to aspects of the present disclosure, a blockchain for location-based services may be generated on a dynamic basis using the techniques disclosed herein. Reconciliation of the blockchain may be done based on the unique components of a transaction, such as the time/location and identifying data about the person/object of interest being tracked. In some embodiments, electronic transactions may be synchronized in the current state database 150 such that all mobile sensors 130 and anchor sensors 120 have a complete copy of all electronic transactions.

In reference to FIG. 2, when any mobile sensor 230 or object 210 comes into proximity of an anchor sensor 220 located at the top and bottom of ski lifts 15 and 4, the anchor sensor may record a transaction in its local sequential transaction database. The sequential transaction may include the unique ID of the nearby (proximate) object 210 or mobile sensor 230, a timestamp, and the unique ID of the anchor sensor 220 recording the transaction. For example, if a skier with an RFID tag (object 210) comes into proximity of the anchor sensor 220b, such as within the range of the anchor sensor's 220b scanner, the anchor sensor 220b may pick up the unique RFID signal of the object 210 and record a transaction in its local database comprising the unique ID of the object 210, a timestamp, and the unique ID of the anchor sensor 220b. The anchor sensors 220 may use additional techniques to scan and identify nearby objects 210, such as picking up a cell phone signal, identifying the object using a visual, sonic, or heat signature, using an optical sensor, e.g., infrared, for detecting an optically responsive tag on the object, etc.

An example of determining the location of objects, such as the RFID device 210 on a ski patron, will now be described. FIG. 2 depicts a mobile sensor 230 (e.g., held by ski patrol) coming into proximity of anchor sensor 220b at time 12:30. At that time, anchor sensor 220b will identify mobile sensor 230 from its transmitting signal and will record a transaction in its local sequential transaction database comprising the unique ID of the mobile sensor 230, a timestamp ("12:30 pm"), and the unique ID of the anchor sensor 220b. Additionally, when the mobile sensor 230 comes into proximity of anchor sensor 220b, the mobile sensor 230 will identify anchor sensor 220b from its transmitted signal and will record a transaction in its local sequential transaction database comprising the unique ID of the anchor sensor 220b, a timestamp ("12:30 pm"), and the unique ID of the mobile sensor 230. In some embodiments, the mobile sensor may further record accurate location data (e.g., GPS data) as part of the transaction when such accurate location data is available. In some embodiments where mobile sensor 230 may not have accurate location data (e.g., where the GPS signal may be weak), mobile sensor 230 may request anchor sensor's 220b accurate location data (or anchor sensor 220b may automatically transmit its location data) and mobile sensor 230 may update its current location to the known accurate location data from the anchor sensor 220b.

In preferred embodiments, the anchor sensor 220b and mobile sensor 230 will exchange copies of their stored transaction data. For example, anchor sensor 220b may transmit its stored transaction data to mobile sensor 230, and mobile sensor 230 may transmit its stored transaction data to anchor sensor 220b. In some embodiments, anchor sensor 220b and mobile sensor 230 may only exchange transactions that are "new" to the receiving sensor, i.e., transactions that the receiving sensor does not already have stored in its local sequential database. After exchanging stored transactions, both the mobile sensor 230 and anchor sensor 220b may reconcile any differences between the stored transactions and the received transactions, merge the transactions received from the other sensor with the stored transactions to create a set of updated transactions, and store the updated transactions.

Transactions may be reconciled as part of a blockchain model. For example, consider a series of four transactions, labelled A, B, C, and D, each having specific location details and a timestamp as described above. A first network element, such as a mobile sensor 130, may have transactions A, C, and D in its local transaction database. A second network, such as anchor sensor 120, may have transactions A, B, and D in its local transaction database.

In one embodiment, upon encountering one another (e.g., such as when mobile sensor 130 comes in proximity to anchor sensor 120), the mobile sensor 130 transmits transactions A, C, and D to the anchor sensor 120, and the anchor sensor 120 transmits transactions A, B, and D to the mobile sensor 130. In some embodiments, the reconciliation of the transaction data may amount to mobile sensor 130 recognizing the missing B transaction and inserting that transaction into its local transaction database. Similarly, the anchor sensor 120 may recognize the missing C transaction and insert that transaction into its local transaction database. Thus, at the end of the exchange, both mobile sensor 130 and anchor sensor 120 would contain transactions A, B, C, and D in their local transaction database.

In other embodiments, upon encountering one another (e.g., such as when mobile sensor 130 comes in proximity to anchor sensor 120), the mobile sensor 130 and anchor sensor 120 may transmit "new" transactions. For example, the mobile sensor 130 may only transmit transaction C to the anchor sensor 120, and the anchor sensor 120 may only transmits transaction D to the mobile sensor 130.

An example of the exchange process is described in further detail below in connection with FIG. 3. Any connected mobile sensor 230 or connected anchor sensor 220 may transmit the updated blockchain transaction data to the network 140 to be delivered to current state database 150.

The dashed line in FIG. 2, near Devil's Draw, depicts the trajectory of mobile sensor 230 within location determination system 200 between 12:30 pm and 12:40 pm. At 12:30 pm, mobile sensor 230 comes into proximity of anchor sensor 220b and mobile sensor 230 and anchor sensor 220b exchange sequential transaction data as described above. At time 12:35 pm, mobile sensor 230 comes into proximity with object 210 corresponding to the RFID tag on the ski patron of interest. Accordingly, the mobile sensor 230 may record a transaction in its sequential transaction database to record the event, where the transaction includes the unique ID of the object 210, the timestamp (e.g., 12:35 pm), and the unique ID of the mobile sensor 230. If accurate location data is available to the mobile sensor 230 (e.g., GPS data), the mobile sensor 230 may also include that location data with the transaction record. Even if location data is not available, the transaction record will reflect that five minutes have passed since mobile sensor 230 came into proximity to anchor sensor 220b—which may have a known, fixed location. At time 12:40 pm, mobile sensor 230 comes into proximity with anchor sensor 220d and exchanges updated sequential transaction data with anchor sensor 220d, including the recorded transaction at 12:35 pm with object 210.

In some embodiments, anchor sensor 220d may be connected to network 140 and may be able to transmit the updated sequential transaction data to current state database 150 via network 140. In embodiments where current state database 150 does not have location data for the anchor sensor 220d, the anchor sensor 220d may transmit its accurate location data to current state database 150 as well. For example, if the anchor sensor 220d is moved between operational periods (e.g., the next day it is placed at the end of another lift), it may electronically transmit its updated, known, location information to current state database 150. In some embodiments, a user device 180 may transmit a request for location information corresponding to object 210 to location server 170. The location server 170 may analyze the current state database transactions corresponding to object 210 in order to determine the location of object 210. For example, subsequent interactions between other mobile sensors 230 and object 210, as transmitted from mobile sensor(s) 230 to current state database 150 via network 140, may confirm, for example, that object 210, is slowly moving down the Devil's Draw ski run.

In some embodiments, location server 170 may analyze historical transaction data in historical database 160 to more accurately predict the location of object 210. For example, historical data from mobile sensors 230 containing accurate GPS information may show that the most frequently traveled path between anchor sensor 220b and anchor sensor 220d is the Devil's Draw run. Additionally, historical transaction data may be used to more accurately predict the location of objects 210 in location determination system 200.

In some embodiments, the position of a moving object of interest at a point in time may be predicted by comparing that object's known position at a point in time (e.g., based on recorded transactions in current state database 150) with those of other objects that have previously moved through the observed space. For example, a vector of motion may be derived containing both an anticipated speed and direction of an object of interest based on the historical movement of similar objects through the same space.

In some embodiments, a vector of motion may be calculated based on historical transaction (time/event) data. Position data, or a transaction, that has been previously detected and recorded in current state database 150 for an object may be electronically migrated (e.g., over a communications link) and stored in the historical database 160. Since objects may move at different rates of speed and on different courses, objects may not be anticipated to always move in a fixed direction. For example, an object moving from point A through point B may end up in some circumstances at end point X. However, that object may instead move from point A through point C to reach X. Additionally, an alternative endpoint Y may be reached by the object moving from A through B or from A through C. The possible paths may create an array, which with increasing historical data, permits probability calculations to be made on the motion of a future object through the same space.

A simplified array based on the example described above may be shown below in table 1:

TABLE 1

| Start point | Waypoint | End point | Frequency | Avg Duration |
| --- | --- | --- | --- | --- |
| A | B | X | 10% | 2 minutes |
| A | C | X | 20% | 4 minutes |
| A | B | Y | 10% | 3 minutes |
| A | C | Y | 60% | 6 minutes |

Table 1

Continuing with this example, one may expect that an object at starting point A to proceed 60% of the time toward Waypoint C, and take less than 4 minutes to get there by combining everything we may know about objects moving from A through C (e.g., that it takes 4 minutes to go from A to C to X, and it takes 6 minutes to go from A to C to Y). Furthermore, knowing that the object has reached C, one could further predict that there is a 75% chance of the object proceeding to endpoint Y. Namely, from point A to point C, an object then goes to endpoint Y 60% out of 80% of the time (75%), and an object goes to endpoint X 20% out of 80% of the time (25%). Additionally, one may predict that the total travel time from point A to waypoint C to endpoint Y may take a total elapsed time of 6 minutes.

In some embodiments, exceptions to the location prediction may be determined if, for example, an object of interest does not appear at a waypoint or is taking longer than average to reach a waypoint. Thus, given a range of possible motion through a given space, a likelihood of a path between the waypoints may also be calculated. Additionally, increasing the number of sensors (anchor sensors 120 or mobile sensors 130) at a waypoint may increase the specificity of a location prediction.

An example calculation under the simplified conditions will now be provided. Continuing with the example above, four possible routes are considered:

Route 1: A→B→X
Route 2: A→C→X
Route 3: A→B→Y
Route 4: A→C→Y

As shown in Table 2 below, the historical database 160 may comprise ten instances where transaction data was gathered on objects moving through these four paths.

TABLE 2

| Instance | Waypoint | Time to WP | Endpoint | Time to EP |
|---|---|---|---|---|
| 1 | B | 1 min | X | 2 min |
| 2 | B | 1 min | Y | 3 min |
| 3 | C | 2 min | X | 3.5 min |
| 4 | C | 2.5 min | X | 4.5 min |
| 5 | C | 2 min | Y | 4 min |
| 6 | C | 2 min | Y | 5 min |
| 7 | C | 3 min | Y | 6 min |
| 8 | C | 3.5 min | Y | 6 min |
| 9 | C | 4 min | Y | 7 min |
| 10 | C | 4 min | Y | 8 min |

From the data in Table 2, example location prediction calculations may comprise, for example:

a) Likelihood to travel through waypoint B (20%) or waypoint C (80%)

b) Expected time to reach waypoint B (1 min) or waypoint C (2.875 min)

c) Likelihood to travel to endpoint X (30%) or endpoint Y (70%)

d) Expected time to travel to endpoint X (3 min) or endpoint Y (6 min)

e) Once at waypoint B likelihood to continue to endpoint X (50%) or endpoint Y (50%)

f) Once at waypoint C likelihood to continue to endpoint X (25%) or endpoint Y (75%)

g) Expected additional travel time from waypoint B to endpoint X (1 min)

h) Expected additional travel time from waypoint B to endpoint Y (1 min)

i) Expected additional travel time from waypoint C to endpoint X (1.75 min)

j) Expected additional travel time from waypoint C to endpoint Y (3.08 min)

The present disclosure is not limited to the example above with points A, B, C, X, and Y, and the example may reflect simplified conditions and is provided for illustrative purposes only. A person of skill in the art should appreciate that, in some embodiments, there may be substantially more data points in historical database 160 for predicting the path of travel of an object of interest in a certain space. Additionally, with increasing historical transaction data in historical database 160, predictions may have more relevance or degrees of certainty given similar objects and similar conditions in the space being evaluated for location prediction.

In preferred embodiments, the anchor sensors 220 with non-changing locations may seed the dynamic location calculations for objects 210. Additionally, in embodiments where mobile sensors 230 may not have accurate location data, or may only have intermittent accurate location data, the location of mobile sensors 230 may be calculated in the same manner as objects 210 using the location data from the anchor sensors 220. However, where mobile sensors 230 do have accurate location data, the location data may be used to further increase the accuracy of the dynamic location calculations.

FIG. 2 depicts a ski resort location determination system for illustration purposes only. A person of ordinary skill in the art should understand that the location determination system 100 may be implemented in a variety of physical environments. For example, the location determination system 100 may be used in the office environment described above to assess whether the layout of the office is best addressing the needs to the employees. In the office environment, a location determination system 100 may comprise one or more connected anchor sensors 120 positioned in conference rooms, one or more unconnected anchor sensors 120 positioned as desks in an "open addressing environment," one or more objects 110 comprising chairs or other moveable apparatus (e.g., a mail cart) with unique identifiers as well as some employees, and one or more mobile sensors 130 attached to other employees. Using the techniques disclosed herein, the anchor sensors 120 and mobile sensors 130 in the office space may record transactions and exchange updated transaction data as mobile sensors 130 and objects 110 move throughout the office environment. When a connected anchor sensor 120 exchanges and receives updated transaction data from a mobile sensor 130, the connected anchor sensor 120 may upload the updated transaction data blockchain through a network 140 to a current state database 150. Thus, the updated transactions in the current state database 150 may be used to generate a near current office space map of the mobile sensors 130 and objects 110. Historical transactions in historical database 160 may additionally be used to make predictions on where people and objects will move next and how the office will be used. An employee or manager using his or her computing device 180 may transmit a request to an application hosted on location server 170 to perform an analysis of the location determinations. Accordingly, the location determination system 100 offers a technological improvement to computerized location determination systems by reducing the computation resources required (e.g., reducing the number of active, connected sensors) to determine the location of a plurality of objects.

Figure 3:
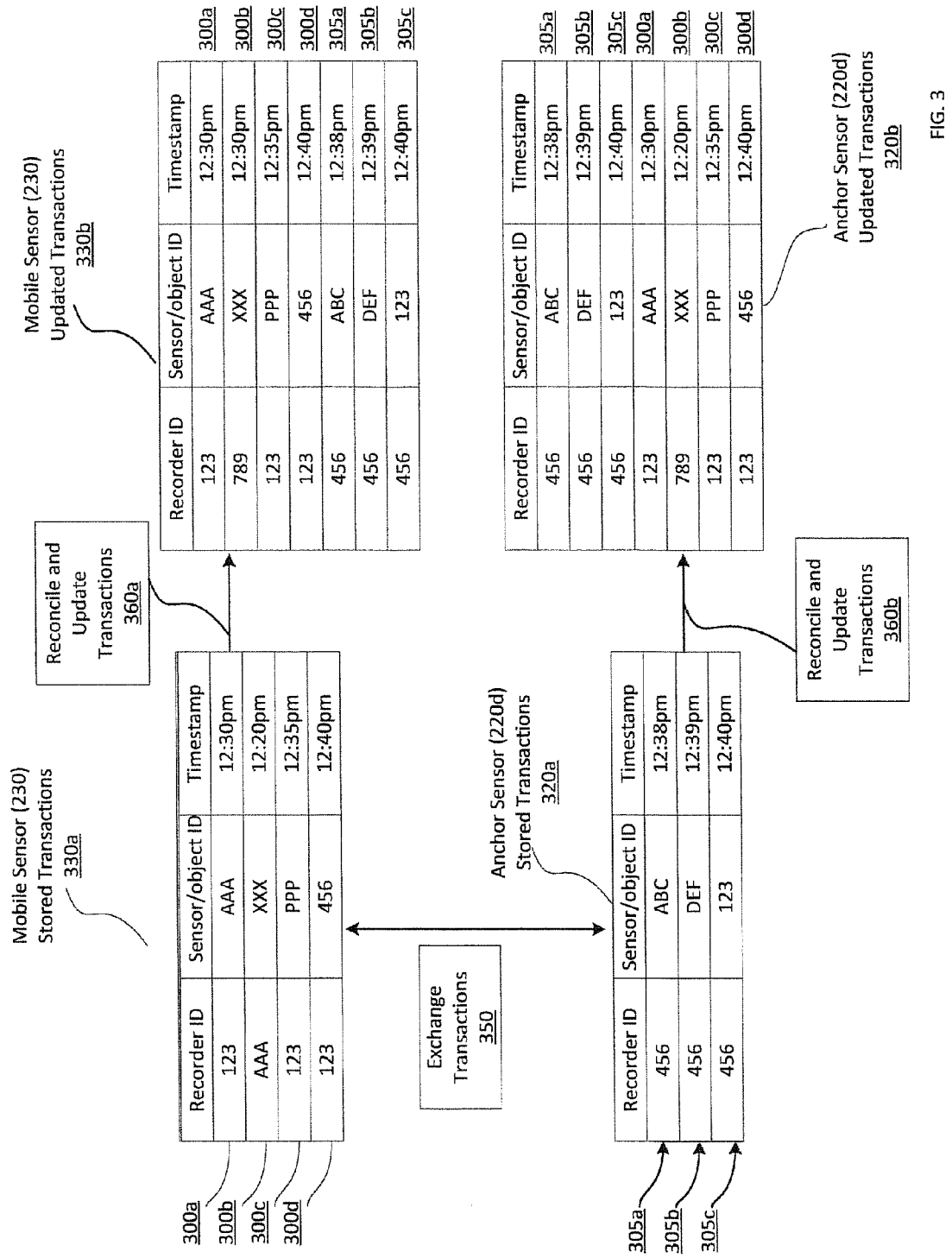
FIG. 3 is a schematic diagram of a transaction blockchain exchange between two sensors embodying aspects of the disclosure.

FIG. 3 is a schematic diagram of a transaction blockchain exchange between two sensors embodying aspects of the disclosure. FIG. 3 illustrates an example of local database records 330a-b and 320a-b for mobile sensor 230 and anchor sensor 220d, respectively, described in connection with FIG. 2 above. In FIG. 3, mobile sensor 230 contains stored transactions 330a with local transaction records 300a-d, and anchor sensor 220d contains stored transactions 320a with local transaction records 305a-c. For purposes of illustration, only a handful of transaction records are shown, but a person of skill in the art should understand that there may be numerous transaction records (hundreds, thousands, millions, etc.) based on the location determination application, the volume of transaction data, and the available memory on the anchored and/or mobile sensor devices.

For example, in response to the event described above in connection with FIG. 2 when mobile sensor 230 moved in proximity to anchor sensor 220b at 12:30 pm, mobile sensor 230 may contain a transaction record 300a comprising the unique identifier of the mobile sensor 230 ("123"), the unique identifier of anchor sensor 220b ("AAA"), and a timestamp of 12:30 pm. Additionally, the mobile sensor 230 may contain a transaction record 300b, which it received in its data exchange with anchor sensor 220b described above in connection with FIG. 2. For example, transaction record 300b may comprise the unique identifier of anchor sensor 220b that recorded the transaction ("AAA"), a unique identifier of a detected nearby mobile sensor or object ("XXX"), and a timestamp ("12:20 pm"), reflecting an event that occurred where a sensor (XXX) moved in proximity to anchor sensor 220b. The next transaction record 300c may correspond to the event that occurred when the mobile sensor 230 was in proximity to and detected object 210 of FIG. 2, and comprises the unique identifier of the mobile sensor 230 ("123"), the unique identifier of the object 210 ("PPP"), and the timestamp of 12:35 pm. The next transaction record 300d may correspond to the event that occurred when the mobile sensor 230 was in proximity to anchor sensor 220d, and comprises the unique identifier of the mobile sensor 230 ("123"), the unique identifier of anchor sensor 220d ("456"), and the timestamp ("12:40 pm").

Anchor sensor 220d may contain transaction records 305a and 305b corresponding to events where another sensor (e.g., a mobile sensor) was in proximity to the anchor sensor 220d. For example, 305a is a transaction record comprising the anchor sensor's 220d unique ID ("456"), the detected unique sensor ID that came in proximity to anchor sensor 220d ("ABC"), and the timestamp of the event ("12:38 pm"). Additionally, 305b is another transaction record comprising the anchor sensor's 220d unique ID ("456"), the detected unique sensor ID that came in proximity to anchor sensor 220d ("DEF"), and the timestamp of the event ("12:39 pm"). Finally, the next transaction record 305c may correspond to the event described above in connection with FIG. 2 when the mobile sensor 230 was in proximity to anchor sensor 220d. As shown in FIG. 3, transaction record 305c comprises the unique identifier of the anchor sensor 220d ("456"), the unique identifier of the mobile sensor 230 ("123"), and the timestamp ("12:40 pm").

When mobile sensor 230 moves nearby, or in proximity to, anchor sensor 220d, both mobile sensor 230 and anchor sensor 220d may exchange transactions 350, as described above. For example, mobile sensor 230 may electronically transmit its stored transactions 330a and transaction records 300a-d to anchor sensor 220d. Additionally, anchor sensor 220d may electronically transmit its stored transactions 320a and transaction records 305a-c to mobile sensor 230.

In response to the exchange of transaction data 350, mobile sensor 230 may reconcile and update its stored transactions 360a. For example, as part of the reconciliation and update process 360a, mobile sensor 230 may merge and store the transaction records 305a-c received from anchor sensor 220d into its local transactions database 330a in order to create an updated local transactions database 330b. Likewise, in response to the exchange of transaction data 350, anchor sensor 220d may reconcile and update its stored transactions 360b. For example, as part of the reconciliation and update process 360b, anchor sensor 220d may merge and store the transaction records 300a-d received from mobile sensor 230 into its local transactions database 320a to create an updated local transactions database 330b. Thus, after the exchange of the transactions 350 between mobile sensor 230 and anchor sensor 220d and the reconciliation and updating of the transactions 360a-b, both mobile sensor 230 and anchor sensor 220d will contain an updated local transactions database 330b, 320b containing all of the transactions recorded and stored by both mobile sensor 230 and anchor sensor 220d.

In some embodiments, the transaction record exchange depicted in FIG. 3 may be performed between two mobile sensors 130. Thus, each mobile sensor 130 may exchange stored transaction data with every other mobile sensor 130 and/or anchored sensor 120 that it comes into contact with in order to maintain a distributed complete copy of all transactions occurring between a mobile sensor 130 and i) another mobile sensor 130, ii) an anchored sensor 120, or iii) an object 110. In some embodiments, anchored sensors 120 are preferably placed far enough apart so that anchored sensors 120 do not transact with other anchored sensors. However, in some embodiments, it may be desirable to record transactions between two anchor sensors 120. The exchanged transactions may be maintained by each mobile sensor 130 and anchor sensor 120 for a specified operational period (e.g., bounded by time and space). For example, in some embodiments, mobile sensors 130 and anchor sensors 120 in location determination system 100 may delete transaction data after a specified operational period in order to free up computational resources, such as memory space.

In preferred embodiments, connected mobile sensors and/or anchored sensors may transmit the updated transaction records to the network 140 for storage in current state database 150. In some embodiments, the accurate location data for anchor sensors 120b may be stored in transaction database 150. However, in some embodiments, such as where the position of an anchor sensor changes periodically (e.g., after an operational period), anchored sensors 120b may transmit their accurate location data to current state database 150 via network 140. Likewise, in some embodiments, mobile sensors 130 may transmit accurate location data, if available, to current state database 150 via network 140.

Figure 4:
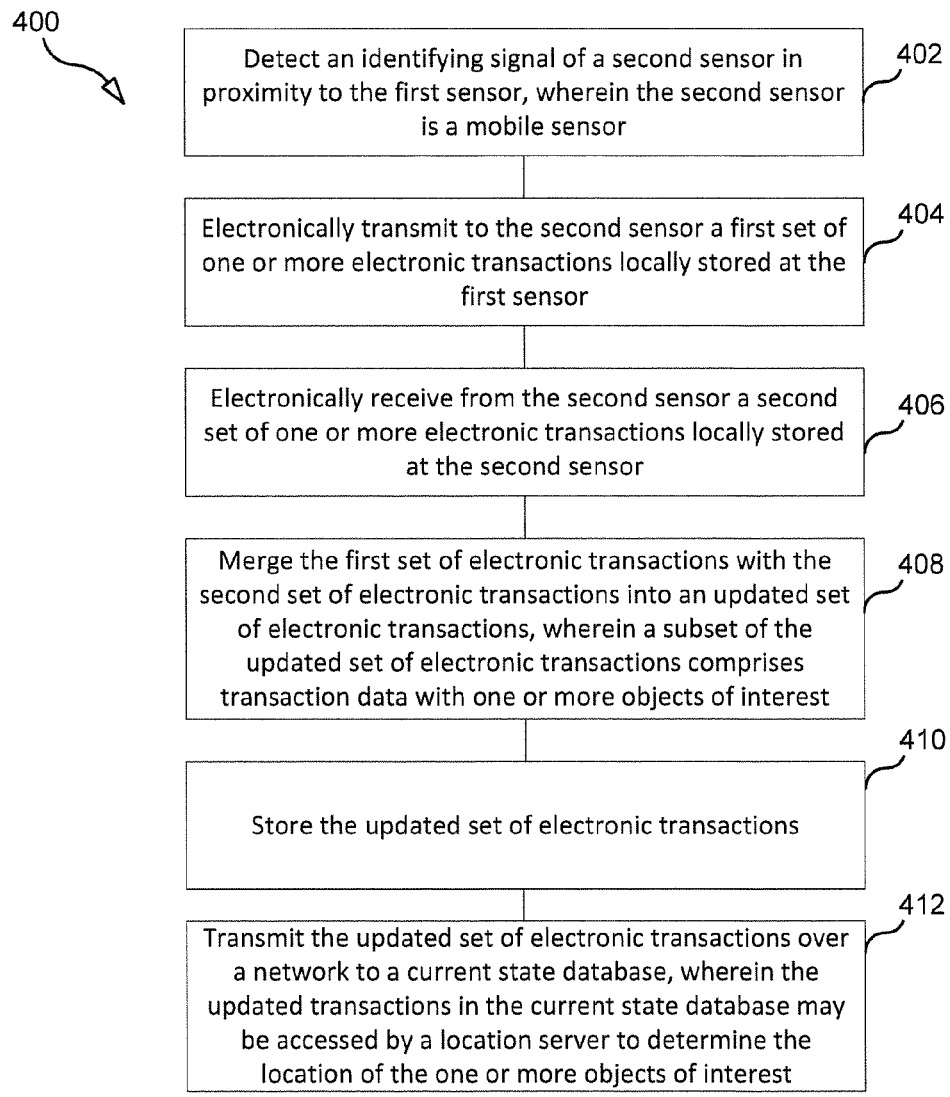
FIG. 4 is a flow diagram of a location determination method embodying aspects of the disclosure.

FIG. 4 is a flow diagram of a location determination method embodying aspects of the disclosure. In some embodiments, method 400 is performed by a connected sensor having accurate location data. For example, method 400 may be performed by an anchored sensor 120 having fixed, accurate position data that is connected to network 140. Alternatively, method 400 may be performed by a mobile sensor 130 having accurate position data (e.g., from a GPS satellite 135) that is connected to network 140.

In step 402, the connected sensor detects an identifying signal of a second sensor in proximity to the connected sensor, wherein the second sensor is a mobile sensor. Two sensors may be characterized as being in proximity of each other if an identifying signal from one sensor may be detected by the second sensor. In some embodiments, a sensor may detect the presence of a second sensor using a scanner, such as a scanning antenna.

In step 404, the connected sensor transmits to the second sensor a first set of one or more electronic transactions locally stored at the first sensor. For example, as described above in connection with FIGS. 2-3, the connected sensor may be an anchored sensor 220d, and the anchored sensor 220d may transmit its stored transactions 320a to mobile sensor 230. In some embodiments, the connected sensor may be a mobile sensor 230, and the mobile sensor 230 may transmit its stored transactions 330a to a second mobile sensor 230 or anchor sensor 220.

In step 406, the connected sensor receives from the second sensor a second set of one or more electronic transactions locally stored at the second, mobile sensor. For example, as described above in connection with FIGS. 2-3, the second mobile sensor 230 may transmit its stored transactions 330a to the connected sensor (e.g., a connected mobile sensor 230 or connected anchor sensor 220).

In step 408, the first set of electronic transactions are merged with the second set of electronic transactions into an updated set of electronic transactions, wherein a subset of the updated set of electronic transactions comprises transaction data with one or more objects of interest. For example, as described above in connection with FIGS. 2-3, transaction data corresponding to an object of interest 210 may be passed between mobile sensor 230 and anchor sensor 220d.

In step 410, the updated set of electronic transactions are stored at the connected sensor. For example, as described above in connection with FIGS. 2-3, updated transaction data 320b including transaction records may be stored locally at the anchor sensor 220d.

In step 412, the updated set of electronic transactions are transmitted over a network to a current state database, wherein the updated transactions in the current state database may be accessed by the location server to determine the location of the one or more objects of interest. For example, as described above in connection with FIGS. 2-3, the anchor sensor 220d may electronically transmit the updated electronic transaction data via network 140 to current state database 150. The transmitted transactions at current state database 150 may in turn be accessed by the location server 170 in response to a request from user device 180 to determine the location of an object of interest, such object 210.

It should be appreciated by those of skill in the art that method 400 may be performed by either an active or anchored sensor with accurate location data that is connected to a network, such as network 140. Additionally, while the transactions described in connection with method 200 may be used to determine the location of an object 110, the transactions may be used to determine the location of a mobile sensor 130 that may not have accurate location data for itself.

Figure 5:
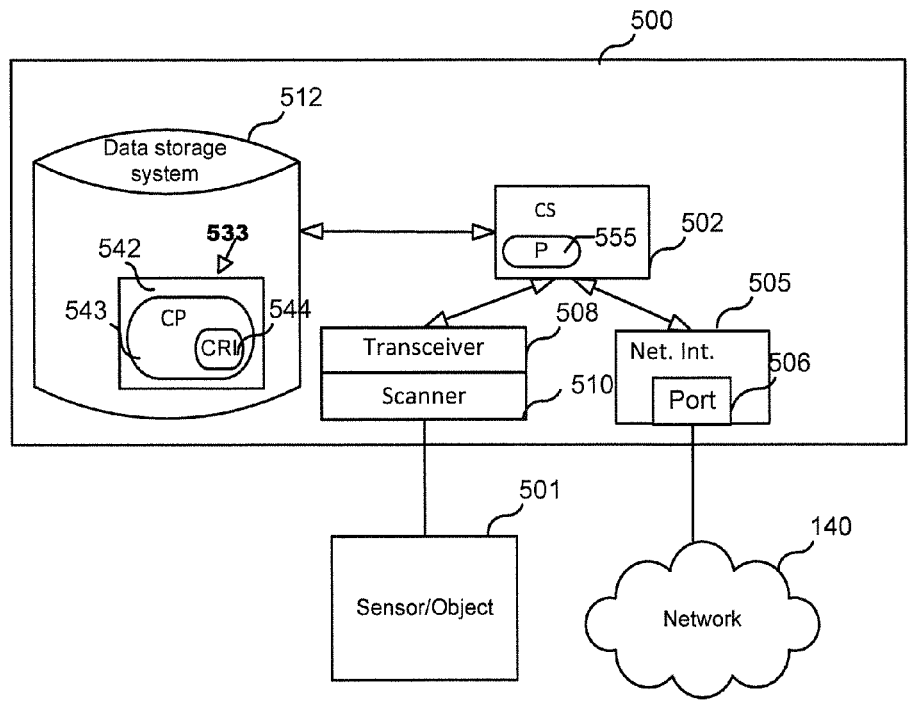
FIG. 5 illustrates a possible implementation for at least some components of a connected sensor embodying aspects of the disclosure.

FIG. 5 illustrates a possible implementation for at least some components of a connected sensor embodying aspects of the disclosure. Sensor apparatus 500 may comprise a connected mobile sensor 130 or a connected anchored sensor 120. As shown in FIG. 5, sensor 500 may include or consist of: a computer system (CS) 502, which may include one or more processors 555 (e.g., a microprocessor) and/or one or more circuits, such as an application specific integrated circuit (ASIC), field-programmable gate arrays (FPGAs), a logic circuit, and the like; a network interface 505 for connecting sensor 500 to network 140; one or more scanners 510 (e.g., a scanning antenna) for detecting the presence of nearby sensors; one or more transceivers 508 for electronically receiving and/or transmitting data between sensor 500 and a second sensor device or object 501 comprising any one of a connected or unconnected sensor, an anchored or mobile sensor, and an object; and a data storage system 512, which may include one or more non-volatile storage devices and/or one or more volatile storage devices (e.g., random access memory (RAM)).

In embodiments where sensor apparatus 500 includes a processor 555, a computer program product (CPP) 533 may be provided. CPP 533 includes or is a computer readable medium (CRM) 542 storing a computer program (CP) 543 comprising computer readable instructions (CRI) 544 for performing steps described herein (e.g., one or more of the steps shown in FIG. 4). CP 543 may include an operating system (OS) and/or application programs. CRM 542 may include a non-transitory computer readable medium, such as, but not limited to, magnetic media (e.g., a hard disk), optical media (e.g., a DVD), solid state devices (e.g., random access memory (RAM), flash memory), and the like.

In some embodiments, the CRI 544 of computer program 543 is configured such that when executed by computer system 502, the CRI causes the apparatus 500 to perform steps described above (e.g., steps described above and below with reference to the flow charts shown in the drawings). In other embodiments, apparatus 500 may be configured to perform steps described herein without the need for a computer program. That is, for example, computer system 502 may consist merely of one or more ASICs. Hence, the features of the embodiments described herein may be implemented in hardware and/or software.

While various embodiments of the present disclosure have been described above, it should be understood that they have been presented by way of example only, and not limitation. Thus, the breadth and scope of the present disclosure should not be limited by any of the above-described exemplary embodiments.

EXEMPLARY EMBODIMENTS

1. A computer implemented method for use in a distributed sensor network for location determination, the method performed by a first connected sensor having accurate location data and comprising the steps of:

detecting an identifying signal of a second sensor in proximity to the first sensor, wherein the second sensor is a mobile sensor;

electronically transmitting to the second sensor a first set of one or more electronic transactions locally stored at the first sensor;

electronically receiving from the identified second sensor a second set of one or more electronic transactions locally stored at the second sensor, wherein at least one of the first and second sets of electronic transactions comprises transaction data with one or more objects of interest;

merging the first set of electronic transactions with the second set of electronic transactions into an updated set of electronic transactions;

storing the updated set of electronic transactions; and, transmitting the updated set of electronic transactions over a network to a current state database, wherein the updated transactions in the current state database may be accessed by a location server to determine the location of the one or more objects of interest.

2. The method of embodiment 1, wherein the first connected sensor comprises a mobile sensor or an anchored sensor.

3. The method of any of embodiments 1-2, wherein the one or more objects of interest comprise one or more transmitting or non-transmitting unique identifying components.

4. The method embodiment 3, wherein the one or more non-transmitting unique identifying components comprises at least one of an identification signature from a radio-frequency identification tag, a visual signature, a heat signature, and a sonic signature and wherein the one or more transmitting unique identifying components comprises a technological signal emitted from a wireless communication device.

5. The method of any of embodiments 1-4, wherein each of the updated transactions comprise a unique ID of a recording sensor, a unique ID of a detected second sensor or an object, and a timestamp.

6. The method of any of embodiments 1-5, wherein the current state database comprises accurate location data, wherein the accurate location data comprises the accurate location data of the first connected sensor and accurate location data for one or more anchor sensors.

7. The method of embodiment 6, wherein the location server determines the location of the one or more objects of interest using the updated stored transactions and the accurate location data in the current state database.

8. The method of any of embodiments 1-7, wherein the updated set of electronic transactions is transmitted to a historical database and is deleted from the current state database and local storage of the first connected sensor and the identified second sensor after an operational period.

9. The method of embodiment 8, further comprising the step of:
predicting the location of an object of interest based on the transactions transmitted to the historical database.

10. The method of embodiment 9, wherein the step of predicting the location of an object of interest further comprises:
calculating a vector of motion based on the electronic transactions transmitted to the historical database.

11. A system for location determination, the system comprising:
a current state database in electronic communication with a network;
a location server comprising a processor and data storage unit in electronic communication with the network;
a mobile sensor comprising a transceiver, a scanner, a processor, and a local data storage unit, wherein the local data storage unit comprises a first set of one or more electronic transactions;
a connected sensor comprising a transceiver, a scanner, a processor, a network interface in electronic communication with the network, and a local data storage unit, wherein the local data storage unit of the connected sensor comprises a second set of one or more electronic transactions and accurate location data, wherein the processor is configured to cause the connected sensor to perform the following steps:
detect, using the scanner, an identifying signal of the mobile sensor;
electronically transmit to the mobile sensor the second set of one or more electronic transactions;
electronically receive from the mobile sensor the first set of one or more electronic transactions, wherein at least one of the first and second sets of electronic transactions comprises transaction data with one or more objects of interest;
merge the first set of electronic transactions with the second set of electronic transactions into an updated set of electronic transactions;
store the updated set of electronic transactions in the local data storage unit of the connected sensor; and,
transmit the updated set of electronic transactions over the network to the current state database, wherein the updated transactions in the current state database may be accessed by the location server to determine the location of the one or more objects of interest.

12. The system of embodiment 11, wherein the first connected sensor comprises a mobile sensor or an anchored sensor.

13. The system of any of embodiments 11-12, wherein the one or more objects of interest comprise one or more transmitting or non-transmitting unique identifying signals.

14. The system of embodiment 13, wherein the one or more non-transmitting unique identifying components comprises at least one of an identification signature from a radio-frequency identification tag, a visual signature, a heat signature, and a sonic signature and wherein the one or more transmitting unique identifying components comprises a technological signal emitted from a wireless communication device.

15. The system of any of embodiments 11-14, wherein each of the updated transactions comprise a unique ID of a recording sensor, a unique ID of a detected second sensor or an object, and a timestamp.

16. The system of any of embodiments 11-15, wherein the current state database comprises accurate location data, wherein the accurate location data comprises the accurate location data of the first connected sensor and accurate location data for one or more anchor sensors.

17. The system of embodiment 16, wherein the location server is configured to:
access one or more of the updated stored transactions and the accurate location data in the current state database, and
determine the location of the one or more objects of interest using the accessed stored transactions and the accurate location data in the current state database.

18. The system of any of embodiments 11-17, further comprising a historical database in electronic communication with the network, wherein after an operational period:
the current state database is configured to transmit the updated set of electronic transactions to the historical database and delete the updated set of electronic transactions from the current state database;
the mobile sensor is configured to delete any electronic transactions stored in its local data storage unit; and
the connected sensor is configured to delete any electronic transactions stored in its local data storage unit.

19. The system of embodiment 18, wherein the location server is configured to:
access a plurality of stored transactions in the historical database, and
predict the location of an object of interest based on the accessed transactions in the historical database.

20. The system of embodiment 19, wherein the location server, as part of the predicting, is further configured to:
calculate a vector of motion based on the accessed transactions in the historical database.

21. A non-transitory computer readable medium storing program instructions executable by a processor of a first connected sensor having accurate location data and causing the first connected sensor to perform the steps of:
detect an identifying signal of a second sensor in proximity to the first sensor, wherein the second sensor is a mobile sensor;
electronically transmit to the second sensor a first set of one or more electronic transactions locally stored at the first sensor;
electronically receive from the identified second sensor a second set of one or more electronic transactions locally stored at the second sensor, wherein at least one of the first and second sets of electronic transactions comprises transaction data with one or more objects of interest;
merge the first set of electronic transactions with the second set of electronic transactions into an updated set of electronic transactions;
store the updated set of electronic transactions; and,
transmit the updated set of electronic transactions over a network to a current state database, wherein the updated transactions in the current state database may be accessed by a location server to determine the location of the one or more objects of interest.

22. The computer readable medium of embodiment 21, wherein each of the updated transactions comprise a unique ID of a recording sensor, a unique ID of a detected second sensor or an object, and a timestamp.

The invention claimed is:
1. A computer implemented method for use in a distributed sensor network for location determination, the method performed by a first connected sensor having accurate location data and comprising the steps of:

detecting an identifying signal of a second sensor in proximity to the first sensor, wherein the second sensor is a mobile sensor;

electronically transmitting to the second sensor a first set of one or more electronic transactions locally stored at the first sensor;

electronically receiving from the identified second sensor a second set of one or more electronic transactions locally stored at the second sensor, wherein at least one of the first and second sets of electronic transactions comprises transaction data with one or more objects of interest;

merging the first set of electronic transactions with the second set of electronic transactions into an updated set of electronic transactions;

storing the updated set of electronic transactions; and, transmitting the updated set of electronic transactions over a network to a current state database, wherein the updated transactions in the current state database may be accessed by a location server to determine the location of the one or more objects of interest.

2. The method of claim 1, wherein the first connected sensor comprises a mobile sensor or an anchored sensor.

3. The method of claim 1, wherein the one or more objects of interest comprise one or more transmitting or non-transmitting unique identifying components.

4. The method of claim 3, wherein the one or more non-transmitting unique identifying components comprises at least one of an identification signature from a radio-frequency identification tag, a visual signature, a heat signature, and a sonic signature and wherein the one or more transmitting unique identifying components comprises a technological signal emitted from a wireless communication device.

5. The method of claim 1, wherein each of the updated transactions comprise a unique ID of a recording sensor, a unique ID of a detected second sensor or an object, and a timestamp.

6. The method of claim 1, wherein the current state database comprises accurate location data, wherein the accurate location data comprises the accurate location data of the first connected sensor and accurate location data for one or more anchor sensors.

7. The method of claim 6, wherein the location server determines the location of the one or more objects of interest using the updated stored transactions and the accurate location data in the current state database.

8. The method of claim 1, wherein the updated set of electronic transactions is transmitted to a historical database and is deleted from the current state database and local storage of the first connected sensor and the identified second sensor after an operational period.

9. The method of claim 8, further comprising the step of:
predicting the location of an object of interest based on the transactions transmitted to the historical database.

10. The method of claim 9, wherein the step of predicting the location of an object of interest further comprises:
calculating a vector of motion based on the electronic transactions transmitted to the historical database.

11. A system for location determination, the system comprising:
a current state database in electronic communication with a network;
a location server comprising a processor and data storage unit in electronic communication with the network;
a mobile sensor comprising a transceiver, a scanner, a processor, and a local data storage unit, wherein the local data storage unit comprises a first set of one or more electronic transactions;
a connected sensor comprising a transceiver, a scanner, a processor, a network interface in electronic communication with the network, and a local data storage unit, wherein the local data storage unit of the connected sensor comprises a second set of one or more electronic transactions and accurate location data, wherein the processor is configured to cause the connected sensor to perform the following steps:
detect, using the scanner, an identifying signal of the mobile sensor;
electronically transmit to the mobile sensor the second set of one or more electronic transactions;
electronically receive from the mobile sensor the first set of one or more electronic transactions, wherein at least one of the first and second sets of transactions comprises transaction data with one or more objects of interest;
merge the first set of electronic transactions with the second set of electronic transactions into an updated set of electronic transactions;
store the updated set of electronic transactions in the local data storage unit of the connected sensor; and,
transmit the updated set of electronic transactions over the network to the current state database, wherein the updated transactions in the current state database may be accessed by the location server to determine the location of the one or more objects of interest.

12. The system of claim 11, wherein the first connected sensor comprises a mobile sensor or an anchored sensor.

13. The system of claim 11, wherein the one or more objects of interest comprise one or more transmitting or non-transmitting unique identifying components.

14. The system of claim 13, wherein the one or more non-transmitting unique identifying components comprises at least one of an identification signature from a radio-frequency identification tag, a visual signature, a heat signature, and a sonic signature and wherein the one or more transmitting unique identifying components comprises a technological signal emitted from a wireless communication device.

15. The system of claim 11, wherein each of the updated transactions comprise a unique ID of a recording sensor, a unique ID of a detected second sensor or an object, and a timestamp.

16. The system of claim 11, wherein the current state database comprises accurate location data, wherein the accurate location data comprises the accurate location data of the first connected sensor and accurate location data for one or more anchor sensors.

17. The system of claim 16, wherein the location server is configured to:
access one or more of the updated stored transactions and the accurate location data in the current state database, and
determine the location of the one or more objects of interest using the accessed stored transactions and the accurate location data in the current state database.

18. The system of claim 11, further comprising a historical database in electronic communication with the network, wherein after an operational period:
the current state database is configured to transmit the updated set of electronic transactions to the historical database and delete the updated set of electronic transactions from the current state database;
the mobile sensor is configured to delete any electronic transactions stored in its local data storage unit; and
the connected sensor is configured to delete any electronic transactions stored in its local data storage unit.

19. The system of claim 18, wherein the location server is configured to:
  access a plurality of stored transactions in the historical database, and
  predict the location of an object of interest based on the accessed transactions in the historical database.

20. The system of claim 19, wherein the location server, as part of the predicting, is further configured to:
  calculate a vector of motion based on the accessed transactions in the historical database.

21. A non-transitory computer readable medium storing program instructions executable by a processor of a first connected sensor having accurate location data and causing the first connected sensor to perform the steps of:
  detect an identifying signal of a second sensor in proximity to the first sensor, wherein the second sensor is a mobile sensor;
  electronically transmit to the second sensor a first set of one or more electronic transactions locally stored at the first sensor;
  electronically receive from the identified second sensor a second set of one or more electronic transactions locally stored at the second sensor, wherein at least one of the first and second sets of electronic transactions comprises transaction data with one or more objects of interest;
  merge the first set of electronic transactions with the second set of electronic transactions into an updated set of electronic transactions;
  store the updated set of electronic transactions; and,
  transmit the updated set of electronic transactions over a network to a current state database, wherein the updated transactions in the current state database may be accessed by a location server to determine the location of the one or more objects of interest.

22. The computer readable medium of claim 21, wherein each of the updated transactions comprise a unique ID of a recording sensor, a unique ID of a detected second sensor or an object, and a timestamp.

* * * * *